UNITED STATES PATENT OFFICE.

JOHN M. HUSSEY, OF WICHITA, KANSAS.

METHOD OF FREEZING AND PRESERVING EGGS.

1,398,860.  Specification of Letters Patent.  Patented Nov. 29, 1921.

No Drawing.  Application filed March 31, 1921.  Serial No. 457,504.

*To all whom it may concern:*

Be it known that I, JOHN M. HUSSEY, a citizen of the United States, residing at Wichita, in the county of Sedgwick and State of Kansas, have invented certain new and useful Improvements in the Method of Freezing and Preserving Eggs, of which the following is a specification.

In the preservation of eggs of poultry by freezing it is customary to remove the shells and then to blend the whites, or albumen, and yolks together into a batter which is then strained and put into cans or other containers to be frozen at a low temperature. If this temperature is near zero F., or below, the egg may be kept practically indefinitely in the frozen state. Eggs frozen and held under temperatures below the freezing point are used extensively by bakers and have become almost indispensable to the baking industry.

It has been found in practice that egg batter must be frozen at very low temperatures, approximately zero F, for, at the higher freezing temperatures bacterial decomposition occurs. However, although the whites, or albumen of the egg, frozen at these low temperatures, show, when thawed ready for use, no deterioration or physical change, the yolks, on the contrary, are decidedly changed in their physical characteristics. They do not resemble liquid egg but are permanently thickened, consisting of a glutinous, pasty mass and a watery liquid, and do not readily combine with milk or other ingredients with which eggs are usually mixed in baking. The whole egg, also, when frozen at the requisite low temperature, shows a similar change, but in a less marked degree.

The object of the present invention is to prevent the permanent thickening of egg batter containing egg yolk when frozen at low temperatures, and to preserve the physical characteristics, flavor, and other qualities of the fresh egg.

I have found that a small quantity of alcohol added to the egg batter before freezing will prevent the yolks or whole egg from thickening, as described above, and will preserve indefinitely in the frozen product the physical characteristics, flavor, and other qualities of the fresh eggs. In practice I add one per cent. by weight of alcohol to the egg batter which is then frozen and held at a temperature below the point at which decomposition might occur, usually about zero F., until needed for use. Egg batter thus treated resembles, when thawed, the natural, fresh egg, and has greater value, commercially, than egg frozen in the usual way.

Other methods, such as the addition of sugar or syrup, have been used to prevent the thickening of yolk or egg batter, but such large volume of sugar or saccharin must be added that the commercial value of the egg so treated is materially reduced. One hundred pounds of such a mixture must contain ten pounds of sugar, the whole being sold as egg at egg prices which are always much higher than those of sugar. On the other hand, one hundred pounds of egg batter to which has been added only one pound of alcohol will contain ninety-nine pounds of egg. My invention, therefore, will lower the cost of the frozen egg product to the bakers who use it.

Having thus described my invention I append the following claims wherein the scope of the invention is indicated:

1. The method of preserving egg which consists in the addition of alcohol to egg batter, freezing the resulting mixture at a temperature sufficiently low to prevent decomposition, and keeping it frozen until needed for use, sufficient alcohol being added to prevent substantially the thickening and physical modification of the egg when thawed.

2. As a new article of manufacture, egg containing added alcohol and frozen below the temperature of decomposition, the quantity of added alcohol being sufficient substantially to prevent thickening and physical modification of the egg when thawed.

In testimony whereof, I affix my signature

JOHN M. HUSSEY.